United States Patent
Hong et al.

(10) Patent No.: US 7,935,392 B2
(45) Date of Patent: May 3, 2011

(54) HIGH-SOLID UV-CURABLE COATING COMPOSITION

(75) Inventors: Su Dong Hong, Gunpo-si (KR); Dong Soo Kim, Suwon-si (KR); Tae Yun Jeong, Ansan-si (KR); Sang Hwan Kim, Gunpo-si (KR); Jung Hyun Oh, Pusan (KR)

(73) Assignee: SSCP Co., Ltd. (KR)

( * ) Notice: Subject to any disclaimer, the term of this patent is extended or adjusted under 35 U.S.C. 154(b) by 162 days.

(21) Appl. No.: 12/088,573

(22) PCT Filed: Feb. 7, 2006

(86) PCT No.: PCT/KR2006/000437
§ 371 (c)(1),
(2), (4) Date: Mar. 28, 2008

(87) PCT Pub. No.: WO2007/043727
PCT Pub. Date: Apr. 19, 2007

(65) Prior Publication Data
US 2008/0255263 A1    Oct. 16, 2008

(30) Foreign Application Priority Data

Oct. 10, 2005 (KR) .................. 10-2005-0094952

(51) Int. Cl.
*C09D 133/08* (2006.01)
(52) U.S. Cl. ........... 427/512; 427/510; 522/79; 522/182
(58) Field of Classification Search ............ 522/79, 522/182; 427/510, 512
See application file for complete search history.

(56) References Cited

U.S. PATENT DOCUMENTS

| | | | | |
|---|---|---|---|---|
| 6,110,988 | A * | 8/2000 | Lake | 522/75 |
| 6,140,386 | A * | 10/2000 | Vanderhoff et al. | 522/78 |
| 7,514,138 | B2 * | 4/2009 | Ariga et al. | 428/195.1 |
| 2004/0091632 | A1 * | 5/2004 | Matsunami et al. | 427/457 |
| 2009/0012198 | A1 * | 1/2009 | Araumi et al. | 522/35 |

FOREIGN PATENT DOCUMENTS
WO    2005/066287    7/2005
* cited by examiner

*Primary Examiner* — Susan W Berman
(74) *Attorney, Agent, or Firm* — Baker Hostetler LLP

(57) ABSTRACT

A high-solid UV-curable coating composition of the present invention, comprising a low viscosity multifunctional acrylate oligomer, a UV-curable monomer, 10% by weight or less of an organic solvent and a photoinitiator has good workability and environmental characteristics and provides a coating film having improved properties.

8 Claims, No Drawings

HIGH-SOLID UV-CURABLE COATING COMPOSITION

FIELD OF THE INVENTION

The present invention relates to a UV-curable coating composition having a low solvent content which provides a good coating film without causing environmental or processability problems.

BACKGROUND OF THE INVENTION

There have been developed various coating compositions such as powder-coating, water-born coating, UV-curable-coating, and high-solid coating compositions, among which UV-curable coating compositions have been widely employed. However, a typical UV-curable composition contains a large quantity, e.g., 45 to 60% by weight of a volatile organic solvent, and when used for spray coating, dip coating, flow coating or spin coating, it causes air pollution, worker's health problem, deformation of the coated substrate, and ineffective energy use.

Thus, there has been a need to develop an environment-friendly UV-curable composition which can minimize problems earned by the use of volatile organic compounds.

SUMMARY OF THE INVENTION

Accordingly, it is a primary object of the present invention to provide a high-solid UV-curable coating composition containing 10% by weight or less of an organic solvent which exhibits improved workability and environmental acceptability in obtaining a coating film having improved properties.

In accordance with one aspect of the present invention, there is provided a UV-curable coating composition comprising 20 to 60% by weight of a reactive acrylate oligomer, 20 to 60% by weight of a UV-curable monomer, 1 to 10% by weight of an organic solvent and 1 to 10% by weight of a photoinitiator based on the total weight of the composition, wherein the reactive acrylate oligomer has 4 to 9 functional acrylate groups and exhibits a viscosity of 500 to 20,000 cps (centipoise) at room temperature.

DETAILED DESCRIPTION OF THE INVENTION

The high-solid UV-curable coating composition of the present invention is characterized by comprising a multifunctional acrylate oligomer having a low viscosity at room temperature and 10% by weight of less of an organic solvent.

The multifunctional acrylate oligomer used in the present invention is a reactive acrylate which has 4 to 9 functional acrylate groups and exhibits a low viscosity of 500 to 20,000 cps at room temperature. Representative examples of the acrylate oligomer include a mixture of dipentaerythritol pentaacrylate and dipentaerythritol hexaacrylate.

In the present invention, the acrylate oligomer is used in an amount ranging from 20 to 60% by weight, preferably from 30 to 40% by weight based on the total weight of the composition. When the amount is more than 60% by weight, the cured coating film becomes brittle due to an excessively high crosslinking density and suffers from crack generation by heat or impact, and when less than 20% by weight, mechanical properties of the coating film become poor.

Representative examples of the UV-curable monomer used in the present invention, which acts to control the viscosity of the oligomer as a reactive diluent include pentaerythritol tri/tetraacrylate(PETA), trimethylolpropane triacrylate (TMPTA), hexamethylene diacrylate(HDDA), 2-hydroxyethyl acrylate(2-HEA), 2-hydroxypropyl acrylate(2-HPA), isobornyl acrylate(IBOA) and the like. The monomer is used in an amount ranging from 20 to 60% by weight, preferably from 25 to 55% by weight based on the total weight of the composition. When the amount is more than 60% by weight the curing rate becomes low, and mechanical and chemical properties of the coating film become poor, and when less than 20% by weight, the workability and leveling ability deteriorate.

Representative examples of the organic solvent used in the present invention include methyl isobutyl ketone, methyl ethyl ketone, dimethyl ketone, isopropyl alcohol, isobutyl alcohol, normal butyl alcohol, ethyl acetate, normal butyl acetate, ethyl cellosolve, butyl cellosolve and the like. The organic solvent is used in an amount ranging from 1 to 10% by weight, preferably from 5 to 10% by weight based on the total weight of the composition. When the amount is more than 10% by weight the desired effect expected by reducing the amount of the volatile organic compound is not accomplished, and when less than 1% by weight effective blending cannot be formed.

The composition of the present invention comprises a photoinitiator which functions to generate radicals by UV to initiate the crosslinking of unsaturated hydrocarbons. Representative examples of the photoinitiator include 1-hydroxycyclohexyl phenyl ketone(IRGACURE 184), bis(2,4,6-trimethyl benzoyl)phenyl phosphine oxide(IRGACURE 819), 2,4,6-trimethylbenzoyl diphenyl phosphine(TPO), 2-hydroxy-2-methyl-1-phenyl-1-propane(DAROCUR 1173), benzophenone(BP) and the like, and it is used in an amount ranging from 1 to 10% by weight preferably from 5 to 7% by weight based on the total weight of the composition.

In order to enhance the slip and gloss characteristics of the coating film, the inventive coating composition may further comprise a leveling agent in an amount ranging from 0.1 to 2% by weight based on the total weight of the composition, the leveling agent being any of the conventional materials used in the coating composition, preferably polysiloxan, e.g., BYK-300, BYK-333, BYK-310 (commercially available from BYK chemie Co.).

In addition, so as to enhance the property of the coating film, the inventive coating composition may further comprise additives such as XP-0396, XP-0596 and XP-0746 (commercially available from hanse chemie Co.) in an amount ranging from 0.1 to 2% by weight based on the total weight of the composition.

The inventive composition may be prepared by mixing the low viscosity multifunctional acrylate oligomer, UV-curable monomer and organic solvent in suitable amounts and adding thereto the photoinitiator, as well as the optional leveling agent and other additives, with stirring.

In accordance with the present invention, the coating film may be prepared by spray coating, dip coating, flow coating or spin coating the inventive composition on the surface of a substrate to form a UV-curable film thereon, drying the UV-curable film at room temperature and curing the dried film by means of UV irradiation. When a spray coating method is employed it is desirable to dry the coated film at room temperature for 1 to 2 min.

The inventive coating film may have a thickness ranging from 5 to 50 μm, and have improved properties in term of adhesion, pencil hardness, gloss and moisture-, chemical-, abrasion- and acid-resistance.

As described above, the inventive UV-curable coating composition containing a very small quantity of the organic solvent has good workability and acceptable environmental characteristics, and is capable of providing a coating film having improved properties. Accordingly, it is useful for the coating of products such as mobile phones, automobiles and electronic appliances.

The following Examples and Comparative Examples are given for the purpose of illustration only and are not intended to limit the scope of the invention.

<Preparation of UV-curable Coating Compositions>

EXAMPLE 1

35% by weight of dipentaerythritol penta/hexaacrylate mixture having a viscosity of 6,000 cps (Brookfield DV-II) at 25° C. (N-4612, San Nopco Co., Japan), 14% by weight of trimethylolpropane triacrylate, 17% by weight of hexamethylenediol diacrylate and 17.5% by weight of 2-hydroxypropyl acrylate were added to a mixture of 3% by weight of methylisobutyl ketone, 5% by weight of isobutyl alcohol and 2% by weight of dimethyl ketone while stirring. Then, 6% by weight of DAROCUR 1173 (CIBA-GEIGY) as a photoinitiator and 0.5% by weight of BYK-333(BYK chemie) as a leveling agent were added thereto, and the resulting mixture was stirred for 20 min, to obtain a high-solid UV-curable coating composition(non-volatile content, 90 wt %). Here, the percentage values of the components are based on the weight of the final composition

EXAMPLE 2

The procedure of Example 1 was repeated except for using 30% by weight of dipentaerythritol penta/hexaacrylate, 14% by weight of pentaerythritol tri/tetraacrylate instead of trimethylolpropane triacrylate and 22.5% by weight of 2-hydroxypropyl acrylate, to obtain a high-solid UV-curable coating composition(non-volatile content, 90%).

EXAMPLE 3

The procedure of Example 1 was repeated except for using 30% by weight of dipentaerythritol penta/hexaacrylate and 22.5% by weight of isobornylacrylate instead of 2-hydroxypropyl acrylate, to obtain a high-solid UV-curable coating composition(non-volatile content, 90%).

EXAMPLE 4

The procedure of Example 1 was repeated except for using 30% by weight of dipentaerythritol penta/hexaacrylate, 15% by weight of trimethylolpropane triacrylate, 26.5% by weight of 2-hydroxypropyl acrylate, and a combination of 3% by weight of methylisobutyl ketone and 2% by weight of isobutyl alcohol as the organic solvent, to obtain a high-solid UV-curable coating composition(non-volatile content, 95%),

COMPARATIVE EXAMPLE 1

In accordance with the composition of a conventional UV-curable coating composition, 15% by weight of urethane-acrylate oligomer (EBECRYL 1290, UCB, Belgium) having a viscosity of 2,000 cps at 60° C., 11% by weight of urethaneacrylate oligomer (EBECRYL 9260) having a viscosity of 2,000~4,000 cps at 60° C., 6% by weight of trimethylolpropane triacrylate and 7% by weight of methylenediol diacrylate were added to a mixture of 30% by weight of toluene, 15% by weight of methyl isobutyl ketone, 5% by weight of ethyl acetate and 5% by weight of ethyl cellosolve while stirring. Then, 5% by weight of DAROCUR 1173 as a photoinitiator and 1% by weight of BYK-333(BYK chemie) as a leveling agent were added thereto, and the resulting mixture was stirred for 30 min to obtain an UV-curable coating composition(non-volatile content, 45%). Here, the percentage values are based on the weight of the final composition.

<Preparation of Coating Films>

EXAMPLES 5 TO 8

The high-solid UV-curable coating compositions obtained in Examples 1 to 4 were each coated on a polycarbonate substrate coated with a UVP primer (for a UV-curable top coat) by spray coating, which was subject to drying at room temperature (25° C.) for 1 to 2 min to remove a trace amount of residual organic solvent. The dried coated substrate was cured twice at a line speed of 10/min and a light intensity of 300 mJ/cm² with a fusion lamp(Fusion System Co.) to prepare a 15~20 μm thick coating film.

COMPARATIVE EXAMPLE 2

The procedure of Examples 5 to 8 was repeated except for using the UV-curable coating composition obtained in Comparative Example 1 and drying at 60° C. for 1 to 2 min to remove the residual organic solvent, to prepare a 15~20 μm thick coating film.

Assay of Film Properties

EXPERIMENTAL EXAMPLE

The physical and chemical characteristics of the coating films obtained in Examples 5 to 8 and Comparative Example 2 were evaluated in accordance with the following methods.
(1) Adhesion Property: ASTM D3359-87

A coating film was cut in a checkered pattern at 1 mm intervals to form 100 1 mm×1 mm squares. An adhesive test tape was firmly attached to the formed pattern and removed at an angle of 180 degrees by a sharp peeling motion, which was repeated three times. The state of the pattern was examined and the results were evaluated according to the following criteria:

5B: peeling at the cut edge or within the patterned area is absent 4B slight peeling at the cut edge—the area peeled is less than 5% of the patterned area 3B: some peeling and breakage at the cut edge—the area peeled is less than 15% of the patterned area 2B: considerable peeling and breakage at the cut edge and within the patterned area—the area peeled is less than 35% of the patterned area 1B: extensive ribbon-type peeling—the area peeled is in the range from 35 to 65% of the pattern area 0B: poor adhesiveness—the area peeled is more than 65% of the patterned area (2) Pencil Hardness: ASTM D3363-74

A test coating film was scratched with a pencil of varying hardness under a constant pressure at an angle of 45 degrees, which was repeated five times. The hardness value of the pencil produced only one scratch or breakage of the coating layer is referred to as the pencil hardness.

(3) Gloss

The gloss value of a test coating film was measured at light acceptance and incident angles of 60 degrees with a BYK-GARDNER glossmeter, and the result obtained was expressed as a percentage value based on the gloss value of the base plane of 100.

(4) Abrasion Resistance

The surface of a test coating film was rubbed with an eraser under a 500 g-load at a rate of 40 times/mm. The state of the resulting material was examined with the naked eye.

(5) Chemical Resistance

The surface of a coating film was dipped in 99.3% methanol, followed by rubbing with an eraser under a 500 g-load at a rate of 40 times/min. The state of the resulting material was examined with the naked eye.

(6) Moisture Resistance

The degree of aspect deformation and adhesion property were tested after exposing a test specimen to a condition of 50° C. and 95% relative humidity for 72 hours.

(7) Acid Resistance

The degree of aspect deformation and adhesion property were tested after treating a test specimen with a standard pH 4.6 solution for 72 hours.

(8) UV Test (QUV)

The degree of aspect deformation and adhesion property were tested after keeping a test specimen for 72 hours in a UV tester(QUV, Q-Pannel).

The physical properties of the coating films thus measured are showed in Table 1.

TABLE 1

|  | Example 5 | Example 6 | Example 7 | Example 8 | Comparative Example 2 |
|---|---|---|---|---|---|
| Nonvolatile content of coating composition(%) | 90 | 90 | 90 | 95 | 45 |
| Adhesion property | 5B | 5B | 5B | 5B | 5B |
| Pencil hardness | H | H | H | HB | HB |
| Gloss(60°) | 142 | 139 | 138 | 139 | 124 |
| Abrasion resistance | ⊚ | ⊚ | ⊚ | ○ | Δ |
| Chemical resistance | ⊚ | ⊚ | ⊚ | ○ | Δ |
| Moisture resistance | ⊚ | ⊚ | ⊚ | ⊚ | ⊚ |
| Acid Resistance | ⊚ | ⊚ | ⊚ | ○ | Δ |
| UV Test | 2.63 | 2.73 | 2.67 | 3.21 | 2.78 |

⊚; excellent,
○; good,
Δ; fair

As shown in Table 1, the coating films obtained using the inventive compositions exhibit improved characteristics in terms of adhesion property, pencil hardness, gloss, abrasion resistance, chemical resistance, moisture resistance and acid resistance, as compared to those obtained using conventional compositions.

While the invention has been described with respect to the above specific embodiments, it should be recognized that various modifications and changes may be made to the invention by those skilled in the art which also fall within the scope of the invention as defined by the appended claims.

What is claimed is:

1. A ultraviolet(UV)-curable coating composition comprising 20 to 60% by weight of a reactive acrylate oligomer, 20 to 60% by weight of a ultraviolet(UV)-curable monomer, 5 to 10% by weight of an organic solvent and 1 to 10% by weight of a photoinitiator based on the total weight of the composition, wherein the reactive acrylate oligomer consists of a mixture of dipentaerythritol pentaacrylate and dipentaerythritol hexaacrylate and the coating composition and exhibits a viscosity of 500 to 20,000 cps at room temperature and is limited to a mixture of dipentaervthritol pentaacrylate and dipentaerythritol hexaacrylate.

2. The ultraviolet(UV)-curable coating composition of claim 1, wherein the ultraviolet(UV)-curable monomer is selected from the group consisting of pentaerythritol tri/tetraacrylate(PETA), trimethylolpropane triacrylate(TMPTA), hexamethylene diacrylate(HDDA), 2-hydroxyethyl acrylate (2-HEA), 2-hydroxypropyl acrylate(2-HPA), isobornyl acrylate(IBOA) and a mixture thereof.

3. The ultraviolet(UV)-curable coating composition of claim 1, wherein the organic solvent is selected from the group consisting of methyl isobutyl ketone, methyl ethyl ketone, dimethyl ketone, isopropyl alcohol, isobutyl alcohol, butyl alcohol, ethyl acetate, butyl acetate, ethyl cellosolve, butyl cellosolve and a mixture thereof.

4. A method for preparing a coating film comprising spray coating, dip coating, flow coating or spin coating the composition according to according to claim 1, 2 or 3 on the surface of a substrate to form a ultraviolet(UV)-curable film thereon, drying the ultraviolet(UV)-curable film at room temperature, and curing the dried film by ultraviolet(UV)-irradiation.

5. The method of claim 4, wherein the substrate is a plastic.

6. A coating film which is prepared by the method of claim 4.

7. A product comprising the coating film of claim 6.

8. The product of claim 7 which is a mobile phone, automobile or electronic appliance.

* * * * *